United States Patent
Silveira E Silva et al.

(10) Patent No.: US 10,300,516 B2
(45) Date of Patent: May 28, 2019

(54) PROCESS FOR PRODUCING A MULTILAYER PIPE BY EXPANSION AND MULTILAYER PIPE PRODUCED BY SAID PROCESS

(71) Applicant: VALLOUREC SOLUÇÕES TUBULARES DO BRASIL S.A., Jaceaba, MG (BR)

(72) Inventors: Julio Marcio Silveira E Silva, Belo Horizonte (BR); Timo Ebeling, Belo Horizonte (BR); Hezick Da Silva Perdigao, Belo Horizonte (BR); Danielle Granha Giorgini, Belo Horizonte (BR); Gustavo Alves Pinheiro, Belo Horizonte (BR); Jochen Peter Ames, Belo Horizonte (BR); Antonio Wagner Da Silva Penna, Amazonas Contagem (BR)

(73) Assignee: VALLOUREC SOLUÇÕES TUBULARES DO BRASIL S.A., Jaceaba MG (BR)

( * ) Notice: Subject to any disclaimer, the term of this patent is extended or adjusted under 35 U.S.C. 154(b) by 177 days.

(21) Appl. No.: 14/913,885

(22) PCT Filed: Jul. 23, 2014

(86) PCT No.: PCT/BR2014/000250
§ 371 (c)(1),
(2) Date: Feb. 23, 2016

(87) PCT Pub. No.: WO2014/169367
PCT Pub. Date: Oct. 23, 2014

(65) Prior Publication Data
US 2016/0207086 A1 Jul. 21, 2016

(30) Foreign Application Priority Data
Aug. 23, 2013 (BR) .......................... 1020130216631

(51) Int. Cl.
*B21C 37/15* (2006.01)
*F16L 9/02* (2006.01)
(Continued)

(52) U.S. Cl.
CPC .............. *B21C 37/154* (2013.01); *F16L 9/02* (2013.01); *F16L 58/00* (2013.01); *B21C 37/06* (2013.01)

(58) Field of Classification Search
CPC ......... Y10T 29/49909; Y10T 29/49911; B21D 39/04; C21D 7/06
(Continued)

(56) References Cited

U.S. PATENT DOCUMENTS 3,126,625 A * 3/1964 Laing .................... B21D 39/04
228/112.1
3,156,042 A * 11/1964 Reed ..................... B21C 37/154
228/126

(Continued)

FOREIGN PATENT DOCUMENTS

DE  10 2010 04446 A1  3/2012
JP  S61 283415 A  12/1986
WO  WO 2004/103603 A1  12/2004

OTHER PUBLICATIONS

English Translation JPS61283415 Mori.*
(Continued)

*Primary Examiner* — Jason L Vaughan
*Assistant Examiner* — Amanda Kreiling
(74) *Attorney, Agent, or Firm* — Sheridan Ross P.C.

(57) ABSTRACT

A process for producing a multilayer pipe by expansion is disclosed, with or without heating, in which a multilayer pipe (1) comprises at least one outer pipe of metallic material (10) and an inner pipe of metallic material (20), the inner pipe of metallic material (20) having a yield strength
(Continued)

lower than the yield strength of the outer pipe (23) and an external diameter smaller than the internal diameter of the outer pipe. The process for producing the multilayer pipe comprises a mounting step (34) between the pipes (10, 20), wherein the inner pipe is inserted inside the outer pipe, and at least one mechanical expansion step (36), comprising moving a mandrel (2) longitudinally and internally in the inner pipe (20) while the outer pipe and the inner pipe are held at a fixed position, wherein at least part of the mandrel (2) has a greater external diameter than the internal diameter of the inner pipe. When the pipes are subjected to a process of cold expansion, a "lined pipe" is obtained, which is characterized by mechanical bonding between the pipes. When the pipes are subjected to a process of hot expansion, a "clad pipe" is obtained, which is characterized by metallurgical bonding between the pipes.

18 Claims, 5 Drawing Sheets

(51) Int. Cl.
*F16L 58/00* (2006.01)
*B21C 37/06* (2006.01)

(58) Field of Classification Search
USPC .................................................. 72/41, 42
See application file for complete search history.

(56) References Cited

U.S. PATENT DOCUMENTS

| 3,481,762 | A | * | 12/1969 | Streicher | ................... | B22F 3/20 |
|---|---|---|---|---|---|---|
| | | | | | | 428/469 |
| 3,863,328 | A | * | 2/1975 | Arntz | .................... | B21C 37/154 |
| | | | | | | 138/151 |
| 3,983,042 | A | * | 9/1976 | Jain | ...................... | C10M 173/02 |
| | | | | | | 508/121 |
| 5,097,585 | A | * | 3/1992 | Klemm | ................. | B21C 37/154 |
| | | | | | | 138/140 |
| 2007/0132228 | A1 | * | 6/2007 | Montague | ............. | B21C 37/154 |
| | | | | | | 285/123.15 |

OTHER PUBLICATIONS

International Search Report prepared by the European Patent Office on Oct. 9, 2014, for International Application No. PCT/BR2014/000250.

Written Opinion prepared by the European Patent Office on Oct. 9, 2014, for International Application No. PCT/BR2014/000250.

* cited by examiner

PROCESS FOR PRODUCING A MULTILAYER PIPE BY EXPANSION AND MULTILAYER PIPE PRODUCED BY SAID PROCESS

CROSS REFERENCE TO RELATED APPLICATIONS

This application is a national stage application under 35 U.S.C. 371 and claims the benefit of PCT Application No. PCT/BR2014/000250 having an international filing date of Jul. 23, 2014, which designated the United States, which PCT application claimed the benefit of Brazilian Patent Application No. BR 10 2013 021663 1 filed Aug. 23, 2013, the disclosures of which are incorporated herein by reference.

The present invention relates to a process for producing a multilayer pipe from at least one inner pipe and one outer pipe by means of at least one mechanical forming step. The pipes produced by this method typically have a corrosion-resistant layer, which enables their use in highly corrosive environments.

DESCRIPTION OF THE PRIOR ART

Multilayer pipes, such as pipes having a metallurgical bond (also known as "clad pipes") and pipes having a mechanical bond (also known as "lined pipes"), as well as their processes of manufacturing are object of current industrial development, said multilayer pipes being mainly used in the oil industry wherein there may be strong mechanical stress and highly corrosive environments. Sometimes, the internally circulating fluid may also promote a chemical attack to the pipe, requiring the use of corrosion-resistant alloys (CRA).

According to the definition provided in the standards DNV-OS-F101 and API 5LD, a clad pipe consists of an external pipe having a corrosion-resistant inner layer where the bond between these materials is metallurgical. According to the definition provided in the standards DNV OS F101 and API 5LD, a lined pipe consists of an external pipe having a corrosion-resistant inner layer, where the bond between these materials is mechanical. The clad pipes may optionally be manufactured from lined pipes.

The prior art contains several processes for manufacturing clad pipes, generally including a material preparation step, an optional layer step and a cladding step. Two well-known processes used in industrial scale for large production batches are cladding by rolling and overlay welding. In the cladding process by sheet rolling, the sheet rolling of two different materials is made simultaneously, said process originating one single clad sheet. This sheet is then treated, formed and welded longitudinally originating the seam clad pipe.

In the cladding process by overlay welding, the materials are joined by deposition of fillet welds throughout the inner pipe surface. The material used in the fillet weld is normally a corrosion-resistant alloy. The weld deposition process enables a metallurgical bond between the internal and external materials of the seamless clad pipe.

Another process for manufacturing a seamless clad pipe is described in document GB2085330. The clad pipe is formed by at least two metal layers comprising a cold drawing step to obtain a good mechanical bond of the layers, resulting in a lined pipe in which preferably the ends are welded so as to prevent intrusion of air between the pipes. The drawing carried out is thus not sufficient to ensure the quality of the product. A step of hot forming in which the lined pipe is heated, preferably in a furnace is also carried out, and preferably a nickel intermediate layer is disposed to prevent diffusion of carbon. However, this additional layer increases the cost of the product.

The hot forming step disclosed in prior-art document GB2085330 comprises hot pressing or rolling of the outer pipe, but the document does not describe how this hot forming step is performed. Pressing normally requires the manufacture of a special die having fixed pipe-making dimensions. The manufacture of this die and the pressing operation are feasible alternatives only in special applications due to the cost and the impossibility of producing pipes with different sizes.

Document U.S. Pat. No. 3,598,156 discloses a bimetal tubing comprising an intermediate iron or steel layer and two copper layers at the inner and outer surfaces of the pipe. An embodiment of the bimetal tubing contains a cold mechanical expansion step followed by heating between 950° C. and 1050° C. with a high frequency inductor, to obtain the metallurgical bond between the intermediate layer and the outer and inner pipes. The metallurgical bond occurs due to the melting of the intermediate layer; however, no additional pipe forming step is performed. To perform the expansion, a tapered mandrel is used, which is fixed to rod, and the pipe is longitudinally moved along the mandrel, when pulled by the drawing carriage. A second bimetal tubing embodiment exhibits in its manufacturing process a codrawing step followed by heating by electromagnetic induction.

For the bimetal tubing of document U.S. Pat. No. 3,598,156 to be produced in a single cold-forming step, an initial step is required to prepare the material, consisting in galvanizing the intermediate layer, that is, a layer of low-melting point Zn, Pb, Ag, Al needs to be deposited which, when heated, performs a metallurgical bond with the iron or steel pipe without joining the outer and inner layers.

None of the prior-art processes discloses the production of a lined or clad pipe from at least two metal pipes using only one forming step, without the need for additional thermal treatment or forming steps, so as to obtain the multilayer pipe with the desired quality. Similarly, no prior-art reference discloses the production of said multilayer pipes from seamless pipes, and none of the prior art documents discloses a seamless clad pipe.

Thus, the objectives of the present invention are to provide a process for producing multilayer pipes from seamless pipes in a more economical manner, substantially reducing the efforts in the process by expansion, while ensuring the final quality of the multilayer pipes.

BRIEF DESCRIPTION OF THE INVENTION

The objectives of the invention are achieved by a process for producing a multilayer pipe by expansion, wherein the multilayer pipe comprises at least one external layer made from an outer pipe of metallic material and an internal layer made from an inner pipe of metallic material, the inner pipe having an elastic return smaller than the elastic return of outer pipe when both are deformed, and an external diameter smaller than the internal diameter of the outer pipe; said process comprising:

a mounting step of the pipes, wherein the inner pipe is inserted inside the outer pipe;

at least one mechanical expansion step, comprising providing a relative movement between a mandrel and the mounted pipes in the longitudinal direction, with the mandrel being located internally in the inner pipe, wherein at least part of the mandrel has a greater external diameter than the internal diameter of the inner pipe.

Before the mounting step between the pipes, a chemical preparation step is preferably performed in the following sequence:

acid pickling of at least the inner surface of the inner pipe;

neutralizing and washing of the at least the inner surface of the inner pipe; applying lubricant on the inner surface of the inner pipe.

The step of applying lubricant may comprise applying a reactive oil based lubricant or a combination of oxalate and reactive soap.

Preferably, before the mounting step between the pipes, a shot-blasting step is performed on the inner surface of the outer pipe and on the outer surface of the inner pipe.

Alternatively, after the mounting step between the pipes, a positioning step is carried out, in which the outer and inner pipes mounted together are arranged with one end supported on an expansion die and are secured in relation to the expansion bench.

Alternatively, after the mounting step between pipes, a heating step is performed by induction of the outer and inner pipes, synchronizedly with a mechanical expansion step. In this case, before the step of mounting the pipes, a step of lubrifying at least the inner surface of the inner pipe with a lubricant preferably based on a mixture of water and graphite is performed. The process may comprise after at least one mechanical expansion step, a heating by induction step of the inner and outer pipes, synchronizedly with at least one additional hot mechanical expansion step. Alternatively, in the heating step, an electromagnetic induction coil is disposed externally to the outer and inner pipes and moves longitudinally relative to the outer and inner pipes, synchronizedly with the displacement of the mandrel. Alternatively, in the at least one mechanical expansion step, the mandrel is moved longitudinally and internally in the inner pipe while the outer pipe and the inner pipe are held at a fixed position.

In the heating step, alternatively a heating device is disposed internally to the outer and inner pipes and moves longitudinally relative to the outer and inner pipes together with the rod of the mandrel.

The process may further comprise, after the expansion step, a step of bending the multilayer pipe.

The mandrel preferably has the shape of a truncated cone, whose minimum diameter is smaller than the internal diameter of the inner pipe and the maximum diameter is greater than the internal diameter of the inner pipe, causing an adequate elastic deformation of the external pipe during the extrusion process.

After the mounting step, a step of welding the ends of both pipes together and generating a vacuum between the inner and outer pipes may be performed.

During the mechanical expansion step, a step of applying a flux of an inert gas between the inner and outer pipes may be performed.

The objectives of the invention are also achieved by a multilayer pipe, comprising at least one external layer made from an outer pipe of metallic material and an internal layer made from an inner pipe of metallic material, the inner pipe having an elastic return smaller than the elastic return presented by the outer pipe when both are deformed, and an external diameter smaller than the internal diameter of the outer pipe, the multilayer pipe being produced by the previously described process.

The outer pipe may consist of a carbon manganese steel alloy and the inner pipe may be made of a corrosion-resistant alloy.

The inner pipe may be made of a material comprising at least one of carbon steel, low alloy steel, high alloy steel, stainless steel, nickel base alloy, titanium base alloy, cobalt base alloy, copper base alloy, tin base alloy and zirconium base alloy. The outer and inner pipes are preferably seamless pipes.

The multilayer pipe may comprise at least one intermediate layer of metallic material disposed between the outer and inner pipes. The intermediate layer of metallic material may have a melting point lower than the melting points of the outer and inner pipes. The intermediate layer may comprises nickel (Ni) or zirconium (Zn). Alternatively, the multilayer pipe may comprise a layer of corrosion-resistant alloy disposed externally to the outer pipe formed of a second outer pipe having an internal diameter larger than the external diameter of the underlying pipe. This second outer pipe preferably has a yield strength greater than the yield strength of the underlying outer pipe.

BRIEF DESCRIPTION OF THE DRAWINGS

The present invention will be further described in more details based on one example of execution represented in the drawings. The figures show.

DETAILED DESCRIPTION OF THE DRAWINGS

Figure 1:
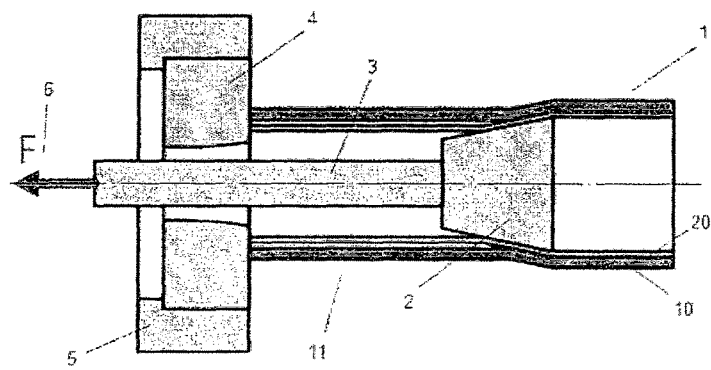
FIG. 1—a schematic view of an embodiment of the expansion step of the process for producing a multilayer pipe by expansion of the present invention.

As illustrated in FIG. 1, the process for producing multilayer pipes according to the present invention is based on the mechanical expansion of two or more metal pipes, one inserted inside the other, so that the pipe produced by the process comprises at least one external layer made from an outer pipe and one internal layer made from an inner pipe.

When only cold expansion is performed, the multilayer pipes produced by this process are lined pipes, so that the at least two metal pipes are attached together only by a mechanical bond. When hot expansion is performed, a metallurgical bond is formed between the at least two pipes in at least a portion of their interface.

The multilayer pipe produced by this process may be a clad pipe, when the bonding between the layers forming the multilayer pipe meets the minimum requirements of norms ASTM A578 and API 5LD, that is, any non-clad area on the surface of the pipe may not exceed a diameter of 25 mm inside a scanned area of a 225 by 225 mm square centered on an indication of a discontinuity. Moreover, the pipe should not have any non-clad area within a distance of 100 mm from the pipe end. According to the present invention, the clad pipe may be manufactured by the process according to the invention with up to 100% cladding between the outer pipe 10 and the inner pipe 20.

In the aspect of the invention shown in FIGS. 1-6, the multilayer pipe 1 is manufactured only from an outer pipe 10 of metallic material and an inner pipe 20 of metallic material, wherein the inner pipe 20 has a smaller elastic return than the elastic return shown by the outer pipe 10 when both are deformed. In addition, the inner pipe 20 preferably has a yield strength (YS) lower than the yield strength of the outer pipe 10.

Figure 2:
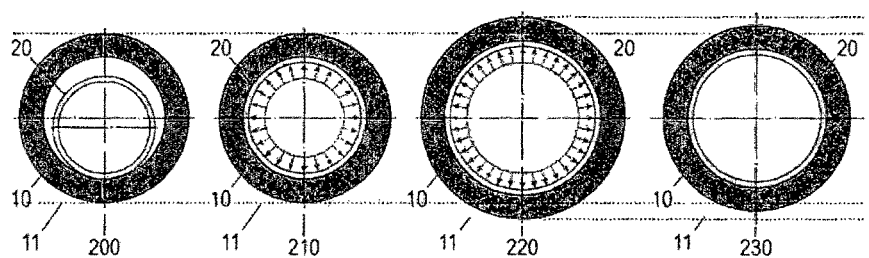
FIG. 2—a stress-strain engineering diagram before, during and after an expansion step of the process of the present invention.

The inner pipe 20 has an external diameter smaller than the internal diameter of the outer pipe 10, as may be seen at the bottom of the diagram in FIG. 2. Preferably, there is a clearance between the outer pipe and the inner pipe to facilitate their engagement.

The inner pipe 20 and the outer pipe 10 are preferably seamless, so as to prevent the multilayer pipe produced from having seams on its surface. Thus, the multilayer pipes having at least a cladded part and/or the lined pipes produced by the process according to the invention are also seamless. In alternative embodiments of the invention, the outer pipe 10 may be a seamless pipe, and the inner pipe 20 may be a welded seam pipe. However, other types of seam pipes may be used within the scope of the present invention. The multilayer pipe may also be manufactured from three or more pipes, one being disposed inside the other and subjected to mechanical expansion forming which is described herein.

Figure 3:
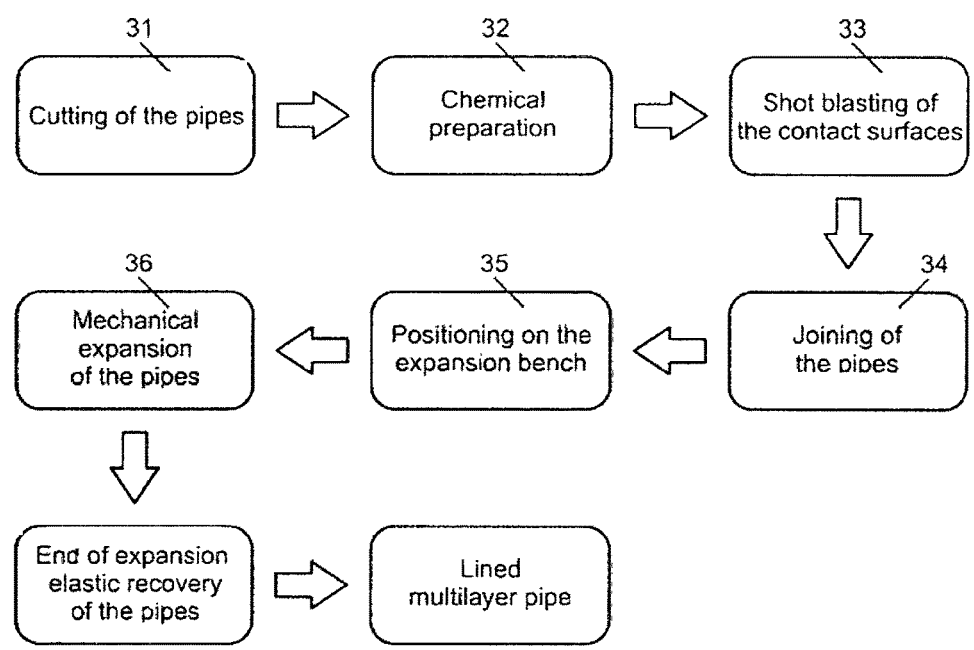
FIG. 3—a block diagram showing a first embodiment of the process of the present invention.

FIG. 3 shows a detailed flowchart of a preferred embodiment of the process according to the invention. Initially, it may be necessary to have steps for preparing the outer and inner pipes before the expansion. These initial preparation steps include, for instance, the straightening of the pipes and flattening of the pipe surfaces so that they are straight and not oval, thus facilitating a later step of inserting one pipe inside the other, because the walls of the outer and inner pipes will be parallel.

Then, if needed, the outer pipe 10 and the inner pipe 20 are measured and cut in length, which may vary according to the resources and tools available, such as the length of the rod and the capacity of the expansion bench.

Then, the process according to the invention preferably comprises the steps of chemical preparation 32 of the pipes, which leads to cleaner surfaces and facilitates the expansion step, contributing to a better performance, because they reduce friction between the pipe and the expansion mandrel. Chemical preparation is particularly applied to the inner surface of the inner pipe 20, which will be in contact with the mandrel 2 during expansion. This complete chemical preparation may also be applied to both the internal surface of the inner pipe and the external surface of the outer pipe, since after this step, no protection is required for the pipe surfaces, and it also improves the final quality of the pipe.

Initially, acid pickling of at least the inner surface of the inner pipe 20 is performed to remove oxides and impurities. Preferably, also the surfaces of the interface of the tubes (outer surface of the inner tube and inner surface of the outer tube) are also subjected to acid pickling, in order to achieve better surface quality and better connection between them. However, when the step of acid pickling is performed by submerging the tubes in an acid solution for practical reasons, then both surfaces of both tubes may be subjected to this step.

Then, at least the inner surface of the inner pipe 20 is neutralized and washed to receive a deposit of lubricant. Also for practical reasons, the steps of neutralizing and washing the tubes may be performed on both surfaces of both tubes.

The lubricant is usually applied to the inner surface of the inner pipe. In general, the lubricant may be soap, mineral oils and other lubricants capable of achieving lower friction conditions, depending on the other process variables, such as the force of the expansion carriage 6, deformation applied, geometry of the tools.

According to one embodiment of the invention, an oxalate layer may be applied before the deposition of the lubricant. This oxalate layer reacts with the metal inner surface of the inner pipe, creating the conditions for applying a reactive lubricant on the same, which is responsible for the decreased friction between the expansion tool and the pipe during its passage through the pipe. Thus, other materials may be applied to the pipes at this step, as long as they also provide a good connection between the pipe and the lubricant. When the oxalate layer is applied, preferably the deposited lubricant used is reactive soap. Alternatively, a reactive oil may be used as the lubricant. In this case, usually there is no need to apply oxalate before applying the lubricant. Also according to an advantageous embodiment of the invention, a step of shot-blasting 33 the inner surface 33 of the outer pipe 10 and the outer surface of the inner pipe 20 is performed which will be mechanically connected together by the expansion process. These surfaces are preferably blasted in order to increase their roughness and optimize the contact force between the materials, thus improving the mechanical bonding between the pipes. The shot-blasting is preferably carried out with steel shots, due to the similarity with the material to be blasted and lower cost, but other types of shots may also be used.

The steps of chemical treatment and shot-blasting respectively contribute to facilitate the process for producing pipes and improve the quality of the final product, but are not essential in the process of the invention.

The inner pipe 20 is then inserted inside the outer pipe 10 in a stage of initial mounting 34 between the pipes 10, 20, so that they can be expanded together. This mounting step may be done automatically or manually, in which case the fit between the pipes must provide sufficient clearance.

According to alternative embodiments of the invention, after the pipes are mounted together, the process may comprise additional steps intended to eliminate or minimize the presence of oxygen between the inner and outer pipes, in order to avoid a formation of oxides in this interface, and thereby providing a better connection between the pipes.

One possibility is to weld the ends of both pipes together and to generate a vacuum between the inner and outer pipes. The vacuum may be generated, for example, through a hole and a vacuum pump. Thereby the oxygen would be eliminated from between the pipes.

Another possibility would be to apply a flux of an inert gas between the inner and outer pipes during the cold expansion step or the hot expansion step, but without the need of welding the pipes ends, in order to assure that the gas remaining between them is not oxygen. Then, the outer pipe 10 and the inner pipe 20 mounted together are subjected to at least one mechanical expansion step 36. In this step (both in case of hot and cold expansion, as will be explained below), a relative movement is provided between the mandrel 2 and the mounted pipes in the longitudinal direction, with the mandrel being positioned internally in the inner pipe 20.

In this step, according to one embodiment of the invention, a mandrel 2 is moved longitudinally within the inner pipe 20, while both inner pipe 20 and the outer pipe 10 are held in a fixed position. For the expansion of these pipes, it is necessary that the external diameter of the mandrel 2 is greater than the internal diameter of the inner pipe 10, as illustrated in FIG. 1. According to this embodiment of the invention, the step of expansion may be carried out on an expansion bench, in which the outer pipe 10 and the inner pipe 20 mounted together are positioned with one of their ends supported on an expansion die 4 as can be seen in FIG. 1. According to another embodiment of the invention, the mandrel is maintained in a fixed position, for example, in an expansion bench, and the pipes are displaced longitudinally relative to the mandrel.

The maximum diameter of expansion die opening 4 is smaller than the nominal diameter of the inner pipe 20. Thus, the outer 10 pipe and the inner pipe 20 mounted together have their axial movements restricted, remaining fixed throughout the mechanical expansion step. An expansion die support 5 secures the expansion die 4 to the expansion bench.

The mandrel 2 has a shape of a truncated cone, and its smaller end has a diameter smaller than the internal diameter of the inner pipe. Thus, the smaller end of the mandrel 2 can be inserted into the one end of the assembly of the inner pipe 20 and outer pipe 10, so that the mandrel is then moved longitudinally within the pipes. The larger portion of the mandrel 2 has a diameter greater than the internal diameter of the inner pipe 10, in order to achieve the expansion of the pipes, causing an adequate elastic deformation of the external pipe during the extrusion process. The mechanical expansion step occurs with the passage with interference of mandrel 2 along the length of the inner pipe 20 and the outer pipe 10 mounted together, moving longitudinally with respect to the expansion die support 5. A force of the expansion carriage 6 is applied onto a rod 3 fixed to the mandrel 2, being responsible for this movement. A multilayer pipe 1 is obtained after mechanical expansion. Thus, the mandrel will cause deformation on the wall thickness of the inner pipe, and the expansion of inner pipe will cause deformation on the wall thickness of the outer pipe.

The cold expansion step is preferably performed 1 to 10 times, at a speed varying from 0.2-20.0 m/min and at room temperature. The deformation applied to the inner pipe varies from 0.1-20.0% and the deformation applied to the outer pipe also varies from 0.1-20.0%.

This mechanical expansion step shown in the process of the present invention has the advantage of reducing the effort required by the expansion carriage, since the outer pipe 10 and the inner pipe 20 mounted together remain fixed throughout the process and only rod 3 moves, and the inertia of rod 3 and mandrel 2 is much lower than inertia of the assembly of the outer pipe 10 and the inner pipe 20 or the final multilayer pipe 1. This reduction in effort results in a reduction of energy consumption of the expansion bench and of the process as a whole.

In the stress-strain engineering diagram shown in FIG. 2 the behaviors of the outer and inner pipes are shown before, during and after the stage of expansion of the pipes by varying the cross sections of the pipes. As can be seen in this figure, in an early stage prior to the forming step 200, the inner pipe 20 is disposed within the outer pipe 10, both pipes being shown with their initial diameters and there being a clearance between these diameters. From the point 200 forward, the mandrel 2 begins to be displaced inside the inner pipe 20, causing it to expand and abut the inner surface of the outer pipe 10 at position 210 of the diagram, and then expand the outer pipe, also as shown in position 220 of the diagram. In this position, the outer pipe 10 and the inner pipe 20 have their maximum diameters during the process. Typically, in this process of expansion, the inner pipe 20 undergoes a plastic deformation, while the outer pipe 10 undergoes only elastic deformation. After completion of the passage of the mandrel 2, there is an elastic return of the pipes shown in position 230 of the graph, in which the pipes slightly constrict. This elastic return is characteristic of each material and more particularly of its yield strength (YS), resulting in a reduction of the diameter of the outer pipe 10 and the inner pipe 20. As the metallic material of the outer pipe 10 has a greater elastic return than the elastic return presented by the inner pipe 20 when both are deformed, and preferably also has a yield strength (YS) greater than the material constituting the inner pipe 20, the return of the outer pipe 10 tends to be greater than the return of the inner pipe 20. However, in the present invention, the return of the outer pipe 10 is limited by the return of the inner pipe 20 located therein. Thus, the residual stress of the inner pipe 27 is compressive and the residual stress of the outer pipe 28 is tractive. Thus, the inner pipe 20 presses the outer pipe radially outward and vice versa, providing a contact force between the pipe and, consequently, a mechanical bond between them, forming a multilayer pipe. In this embodiment of the invention in which there is cold expansion, the final pipe is a lined pipe.

Figure 4:
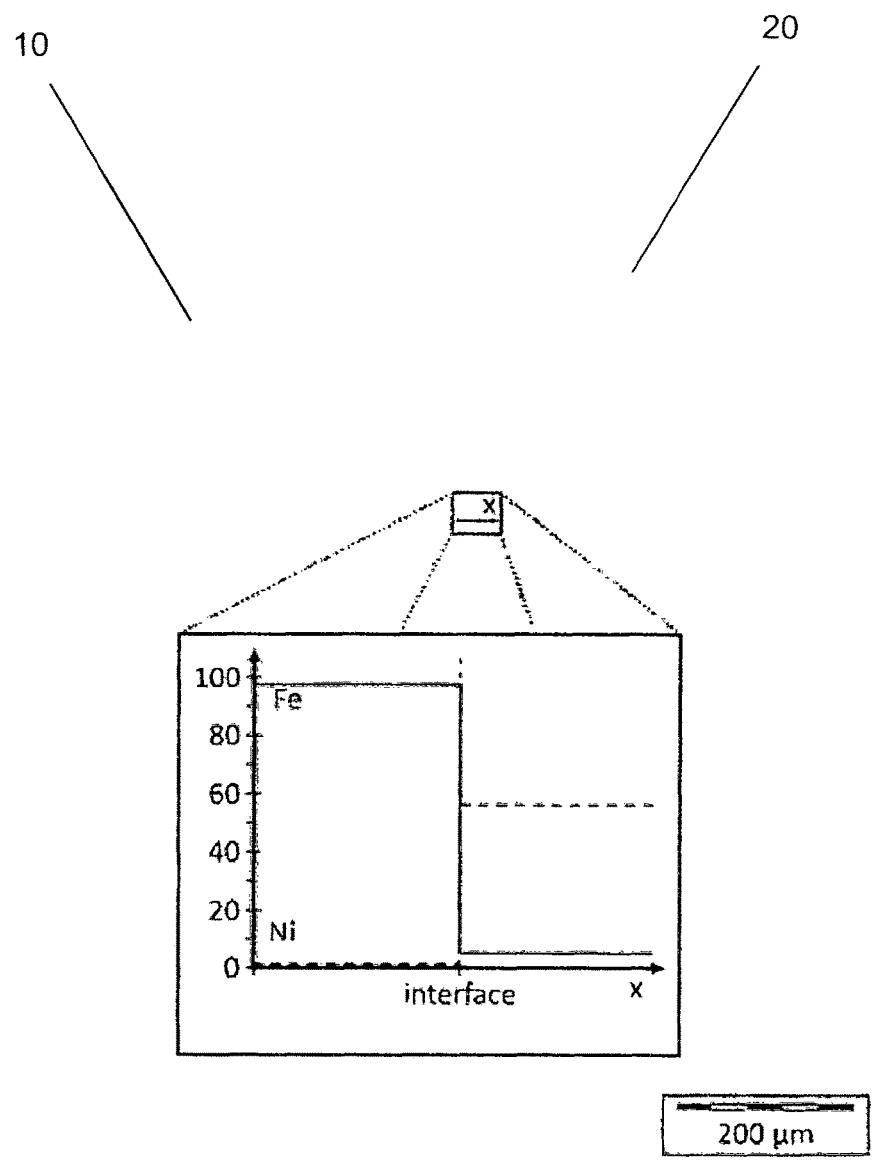
FIG. 4—picture of the interface between the pipes in an embodiment of the cold-formed multilayer pipe in the process of the present invention, associated with a diagram of the concentration of the iron and nickel elements in the interface between the outer and inner pipes.

The mechanical bond between the outer pipe 10 and the inner pipe 20 constituting the lined pipe 1 according to an example of the product of the invention can be seen in FIG. 4. This FIG. contains a microscopic cross-sectional picture of the interface of the junction between the pipes, wherein the outer pipe 10 is shown on the left side in a darker shade of gray and the inner pipe 20 is shown on the right side in a lighter shade of gray. The interface between the pipes in a section corresponding to the upper smaller box is represented in terms of the concentration of the materials of both pipes in the diagram below it. This diagram is an enlarged version of said interface section, in which the ordinate axis represents the concentration of each element in mass percent and the abscissa represents the position in the lined pipe in the direction perpendicular to the interface. The diagram shows the concentration of the elements iron (Fe) and nickel (Ni) in the X direction in the interface region between the pipes in the lined pipe. The solid line represents the concentration of iron which, according to one embodiment of the invention, is one of the main constituents of the outer pipe 10. The dashed line represents the concentration of nickel in this interface region, wherein nickel is a major element of the inner pipe 20 according to this embodiment of the invention. The abrupt change of the concentration of iron and nickel occurs in the same position of the graph representing the interface region between the pipes. This means that there was no remarkable diffusion between the materials of the two pipes, so that there is only a mechanical bond between them, with no metallurgical bond, that is, no cladding.

As can be noticed, the process according to the present invention is capable of producing lined pipes with mechanical bond between the outer pipe and the inner pipe only by cold expansion without the need for heating the pipes. The process of the present invention may comprise more than one step of mechanical expansion, depending on the end product that is desired. Several steps of cold expansion may be carried out, or a combination of cold expansion followed by hot expansion, or only hot expansion.

Figure 6:
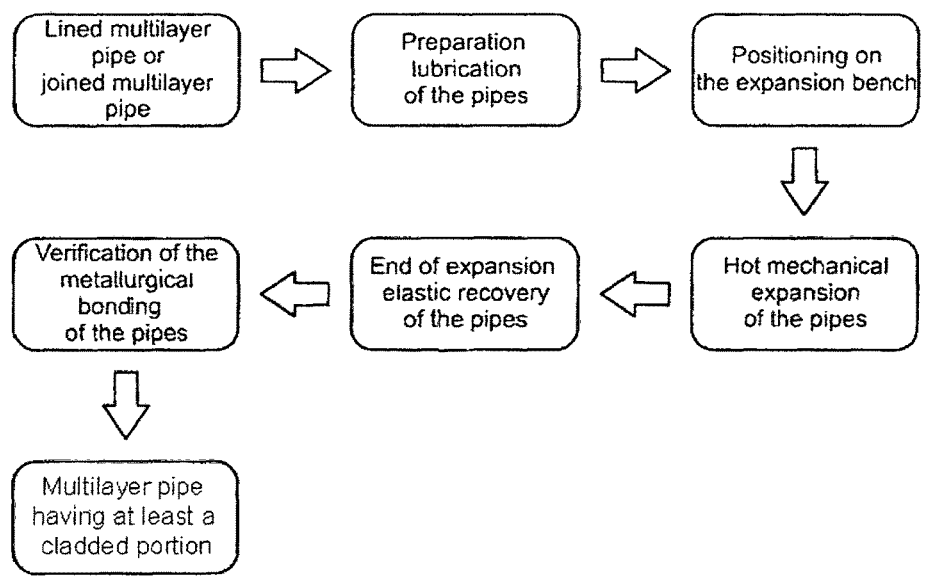
FIG. 6—a block diagram showing a one embodiment of the process of the present invention.

The embodiment of the invention in which the process carries out the hot expansion of the pipe is shown in FIG. 6. In this case, an additional step is performed consisting on heating the inner pipe 20 and the outer pipe 10 mounted together. Heating may be performed by various heating devices that can be operated in the production line of the pipe, for example, by being displaced along the pipe synchronously with the expansion mandrel.

In the cases of hot mechanical expansion, the steps involved in the chemical preparation described above are replaced by a step of applying a lubricant in order to reduce the friction resulting from contact of the tubular element with the expansion die and with the mandrel. The lubricant used is preferably based on a mixture of water and graphite, or any lubricant for high-temperature processes, like the hex-α-BN. This lubricant has the advantage that it does not modify the surface chemical composition of the pipes. The lubricant may be applied by submerging the tube therein, spraying, painting or any other process assuring that a layer of lubricant is formed in the inner surface of the inner tube.

In one embodiment of the invention, heating is carried out by means of an electromagnetic induction coil. The electromagnetic induction coil is disposed externally to the outer pipe 10 and the inner pipe 20 mounted together and moves longitudinally relative to the outer and inner pipes, synchronizedly with the displacement of the mandrel 2, while the pipes are held in a fixed position. If the pipes are fixed on an expansion bench, the coil will move longitudinally also in relation to the expansion die. The mounted pipes enter the coil at ambient temperature, and after being subjected to a magnetic field, are heated by Joule effect (electric current circulating in the steel constituting the pipes) reaching a minimum temperature of 900° C. at the exit of the coil.

Alternatively, in an embodiment not shown in the drawings, the pipes are heated by an internal heating device, which moves inside the pipe with the rod 3 of the mandrel promoting heating from the inner surface of the inner pipe. This internal heating device may also be a coil or another heating device. The internal heating depends on the dinamic heating conditions of the material during the expansion step.

According to another alternative of the invention, the mandrel and the heating device, such as the heating coil, are maintained in a fixed position in series, and the pipes are displaced through them, passing first through the heating device, and then through the mandrel.

Figure 5:
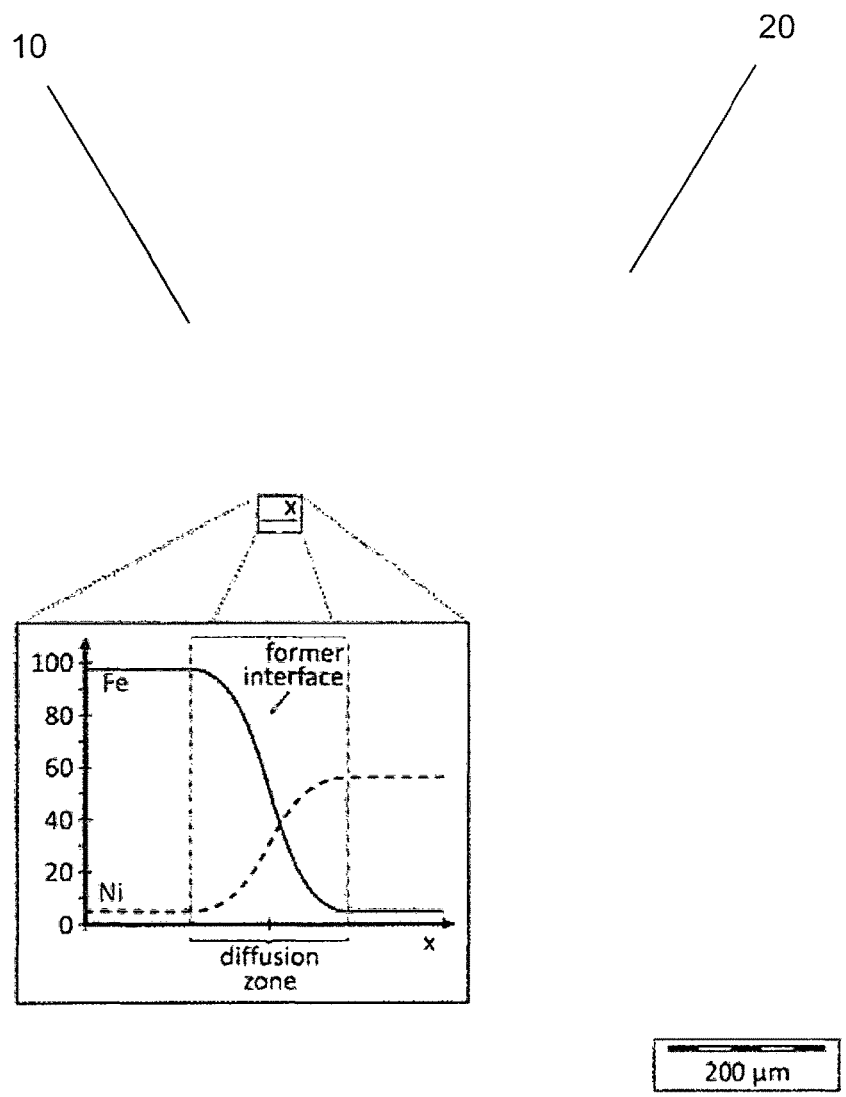
FIG. 5—picture of the interface between the pipes in an embodiment of the hot-formed multilayer pipe in the process of the present invention, associated with a diagram of the concentration of the iron and nickel elements in the interface between the pipes.

At the end of this hot expansion step a clad pipe is obtained, which has a metallurgical bond between the outer pipe 10 and the inner pipe 20, as can be seen in FIG. 5. This hot expansion step can be performed alone or after at least one step of cold expansion.

The hot expansion step is preferably performed 1 to 5 times, at a speed varying from 0.1-5.0 m/min and at a temperature varying from 800-1300° C. FIG. 5 contains a microscopic cross-sectional picture of the interface of the junction between the inner and outer pipes after cladding, according to an exemplary product of the invention, wherein the outer pipe 10 is shown on the left side in a darker shade of gray and the inner pipe 20 is shown on the right side in a lighter shade of gray. In the final pipe having at least a partial a metallurgical bond 1, the interface between the inner pipe and the outer pipe in the cladded areas is extinguished, characterizing metallurgical bonding. The interface between the pipes in a section corresponding to the upper smaller box is represented in terms of the concentration of the materials of both pipes in the diagram below it. This diagram is an enlarged version of said interface section, in which the ordinate axis represents the concentration of each element in mass percent and the abscissa represents the position inside the clad pipe. As in FIG. 4, this diagram shows the concentration of the elements iron (Fe) and nickel (Ni) along the X direction in the interface region between the pipes in the clad pipe. The solid line represents the concentration of iron, representing the outer pipe 10, and the dashed line corresponds to the concentration of nickel representing the inner pipe 20 according to one embodiment of the invention. Note that the variation of concentration of iron and nickel is smoother, providing a diffusion zone in which the two mentioned elements and thereby the materials of inner and outer pipes mix. This means that there was metallurgical bonding, that is, cladding between the pipes. A thicker and more homogeneous diffusion zone commonly leads to a better cladding.

The use of an electromagnetic induction coil for heating of the pipe is advantageous because it allows for rapid and homogenous heating of the pipe by means of dynamic control of the coil power parameters, traction force and speed of the mandrel, which are variable during the process. Furthermore, heating with this coil simultaneously with the expansion step provides higher heating rates than those obtained by other heating means. These high heating rates prevent a possible grain growth, which might occur during a conventional heating if the material is exposed for a long time at high temperatures.

Another advantage of induction heating accomplished in the present invention is that the electromagnetic induction coil is easy to install on the line, and this movable coil eliminates the need for handling hot pipes and moving the equipments, which has a direct impact on safety. Moreover, the induction heating eliminates the need to burn fuel gas for heating the pipes in furnaces, and thus eliminates the need for treating potentially polluting emissions.

In an alternative embodiment of the invention, when hot expansion is performed, the process comprises a step of applying at least one intermediate layer of metallic material to the interface between the outer pipe 10 and the inner pipe 20. This intermediate layer of metallic material may have a melting point lower than the melting point of the metallic materials constituting the outer pipe 10 and the inner pipe 20, but it is not a component necessary to ensure metallurgical bonding between the pipes. The application of the intermediate layer of material must be done before the mounting step between the outer pipe 10 and the inner pipe 20.

The intermediate layer of metallic material may also be formed of a material that has affinity with the metallic materials of the outer pipe 10 and inner pipe 20 in order to avoid the formation of deleterious phases that consequently may weaken the interface between materials. The intermediate layer may consist of nickel (Ni), zirconium (Zn) or other metals or metal alloys. The application of an intermediate layer of the material may be through painting, galvanizing, electroplating, not limited to these application forms.

After hot expansion, a step of bending the multilayer pipe may also be performed, not shown in the drawings. This bending may be performed cold, hot or by folds, not being limited to these methods.

In one embodiment of the manufacturing process, comprising a cold forming step followed by a hot forming step, the cold-formed pipes, called lined pipes, serve as raw material for the manufacture of hot-formed pipes, which are multilayer pipes having at least a cladded part. Obtaining a good mechanical bond during the cold stage helps to ensure a good cladding during the hot forming step.

In alternative embodiments of the invention, when hot expansion is performed, a multilayer pipe of the lined type may be initially used, obtained by other known process for the production of lined pipes. Alternatively, one can carry out only the hot expansion step, without the need for a previous cold forming step.

In the embodiment of the invention in which a cold-forming step is performed followed by a hot-forming step, the process preferably comprises a step of preparing the multilayer pipe carried out after the cold expansion step and before the hot expansion step.

At this stage of preparing the multilayer pipe, the bond between the lined pipe materials may be verified and the multilayer pipe produced by cold expansion may be straightened and the pipe dimensions may be calibrated. The steps of straightening of the pipes and calibration of the pipe dimensions may preferably be performed through cold-co-drawing, which provides a better dimensioning and improves the surface quality of the pipes.

If necessary, a lubricant is applied to the inner surface of the multilayer pipe, which will come again in contact with the mandrel in the additional mechanical expansion step.

When the process of the present invention uses seamless pipes as a raw material for the multilayer pipe, there is no need for a welding process to obtain a pipe, which is usually employed when the pipe is produced from another form of sheet metal. Thus, the multilayer pipes of the present invention preferably are seamless, featuring homogeneous materials in any radial section. However, in principle, the process also applies to longitudinally welded pipes.

The process according to the invention may further comprise heat treatment steps after the hot expansion steps, with the purpose of adjusting material properties. These heat treatment steps depend on the mechanical, metallurgical and corrosion properties of the clad pipe 1 that may need adjustment. Some materials may lose some of their mechanical, metallurgical and corrosion properties during the production steps. These additional thermal treatments may, therefore, be performed, in order to restore the mechanical and metallurgical properties of the pipe, for example, when the pipes 10 and 20 are made of X65 steel and Inconel®. In preferred embodiments of the invention, in the heat treatment step, the multilayer pipe having at least a portion of metallurgical bond is subjected to a cooling or a quenching and tempering step, which contributes to adjusting the mechanical, metallurgical and corrosion properties of the pipe.

The process of the present invention may also comprise a verifying step of the metallurgical bond between the pipes, for confirmation that cladding occurred. The verification may be destructively by cutting a section of the pipe, for example, at intervals of 90° to verify whether in all of these pieces the outer and inner pipes remain attached. Verification can also be non-destructively, through inspection by Ultrassonic testing, analysis of the microstructure, cross sectional analysis of the interface, SEM/EDX or GDOES testing, among others, to check if a metallurgical clad was obtained at least in a part of the pipe produced by the process according to the invention.

The process according to the present invention has a much higher performance when compared with the processes of the prior art, since it does not require any displacement of the pipe or of the inner and outer pipes within the manufacturing installations other than the expansion equipment itself. And in view of the simplicity of the process and the reduced number of steps, it is possible to produce a high amount of lined and/or clad pipes within a small period, with an estimated productivity higher than 100 m/h.

The present invention also relates to the multilayer pipes obtained by the process according to the present invention. The multilayer pipes 1 are manufactured from at least one outer pipe 10 of metallic material and one inner pipe 20 of metallic material, wherein the inner pipe 20 has a smaller elastic return than the elastic return shown by the outer pipe 10 when both are deformed. Since these pipes are usually used in environments related to the oil industry, which are highly corrosive and subjected to strong mechanical stress, the outer pipe 10 is preferably made of metallic material composed of a carbon manganese steel alloy to provide the required mechanical strength to the multilayer pipe. The inner pipe 20 is preferably made of metallic material resistant to corrosion.

According to one embodiment of the invention, the outer pipe 10 may have the following chemical composition:

$C \leq 0.30$
$Mn \leq 1.40$
$P \leq 0.030$
$S \leq 0.030$
$Cu \leq 0.5$
$Cr \leq 0.5$
$Ni \leq 0.5$
$Mo \leq 0.15$
$Nb+V+Ti \leq 0.15$ and the following mechanical properties before and after the process according to the invention (YS=yield strength and UTS=tensile strength):

360 MPa<YS<830 MPa
455 MPa<UTS<935 MPa
minimum elongation $\varepsilon min=15\%$.

The corrosion-resistant alloy of the inner pipe comprises at least one of the materials among carbon steel, low alloy steel, high alloy steel, stainless steel, nickel base alloy, titanium base alloy, cobalt base alloy, copper base alloy, tin base alloy and zirconium base alloy, not being limited to the abovementioned materials. The corrosion level of the corrosion-resistant alloys according to the invention are tested in environment levels I-VII of the International Standard NACE MR0175, wherein the precise corrosion level in each case will depend on the internal material thereof.

The selection of the material of the inner pipe 20 and the outer pipe 10 should preferably observe the criterion of the outer pipe having a higher yield strength compared to the inner pipe, said criterion being important to ensure a good mechanical bond.

In an alternative embodiment of the invention, the multilayer pipe comprises at least one intermediate layer of metallic material disposed between the outer pipe 10 and the inner pipe 20, which has a melting point lower than the melting points of the metallic materials constituting the outer pipe 10 and the inner pipe 20 and has affinity for the metallic materials of the outer pipe 10 and the inner pipe 20 to avoid the formation of deleterious phases. This intermediate layer may be applied through painting, galvanizing, electroplating, not being limited to these application forms.

In an alternative embodiment of the invention, the multilayer pipe further comprises a layer of corrosion-resistant alloy disposed externally to the outer pipe. This layer of material resistant to external corrosion consists of a second outer pipe having an internal diameter greater than the external diameter of the underlying pipe 10. Preferably, the layer of material resistant to external corrosion has a yield strength greater than the yield strength of the outer pipe 10.

Thus, in the pipe manufacturing process of the present invention, this outer pipe of material resistant to corrosion is also subjected to cold or hot expansion and is attached by a mechanical or metallurgical bond, depending on the expansion performed.

The clad pipe produced according to the invention meets the minimum requirements of norms ASTM A578 and API 5LD as described above, and may achieve up to 100% cladding between the outer pipe 10 and the inner pipe 20.

The dimensions of the multilayer lined or clad pipe produced by the process of the present invention will depend on the application thereof. According to one embodiment of the present invention, the pipes may have an external diameter dext varying from 50.80 mm<dext<355.6 mm, and a wall width WT varying from 5.0 mm<WT<30.0 mm, wherein the minimum wall thickness of the pipe of the corrosion resistant alloy for linepipe applications is WTmin-CRA=2.50 mm.

The total deformation values of the final pipe when compared to the initially assembled pipes before the production process according to the invention are the following:
External diameter deformation: 0.1 to 20%
Wall thickness deformation: 0.1 to 40%. The process for producing multilayer pipes, object of the present invention, differs from the prior art because it produces lined pipes by mechanical cold-forming in an economical manner, substantially reducing the effort in the expansion process.

The multilayer pipe obtained by the present invention also has the advantage of being a preferably seamless pipe, which gives the product a higher degree of isotropy and less risk of failure in weld sections.

In the production of clad pipes using hot expansion, the present process differs from the prior art for dispensing with the steps of welding, post heating and finishing by pressing, rolling or other methods of mechanical forming aiming to improve the dimensional quality and the mechanical strength of the final product.

The lined or clad pipes obtained by the process according to the present invention have properties that meet international standards for lined and clad pipes. However, the process provides a simpler implementation and reduced cost when compared to other processes of the prior art.

The example described above represents a preferred embodiment; however, it should be understood that the scope of the present invention encompasses other possible variations, and is limited only by the content of the appended claims, which include all possible equivalents.

The invention claimed is:

1. A process for producing a multilayer pipe by expansion, wherein the multilayer pipe comprises at least one external layer made from an outer pipe comprising a carbon manganese steel alloy and an internal layer made from an inner pipe comprising a corrosion-resistant alloy, the inner pipe having an elastic return smaller than an elastic return of the outer pipe when both are deformed and having an external diameter smaller than an internal diameter of the outer pipe; said process comprising:
    inserting the inner pipe inside the outer pipe to mount the pipes;
    joining the inner pipe and the outer pipe together in a first mechanical expansion, which comprises providing a relative movement between a mandrel and the mounted pipes in a longitudinal direction, with the mandrel being located internally in the inner pipe, wherein at least part of the mandrel has a greater external diameter than an internal diameter of the inner pipe, wherein in the first mechanical expansion, the mandrel causes deformation of a wall thickness of the inner pipe, and the expansion of inner pipe cause elastic deformation of a wall thickness of the outer pipe.

2. The process, according to claim 1, comprising, before the mounting of the pipes, a chemical preparation, comprising:
    acid pickling of at least an inner surface of the inner pipe;
    neutralizing and washing of at least the inner surface of the inner pipe and applying a lubricant on the inner surface of the inner pipe.

3. The process, according to claim 2, wherein applying lubricant comprises applying an oxalate layer and a reactive soap, or applying a reactive oil.

4. The process, according to claim 1, wherein before the mounting of the pipes, shot-blasting on an inner surface of the outer pipe and on an outer surface of the inner pipe.

5. The process, according to claim 1, wherein after the mounting of the pipes, a positioning, in which the outer pipe and the inner pipe mounted together are disposed with one end of the mounted pipes supported on an expansion die and are fixed in relation to an expansion bench.

6. The process, according to claim 1, wherein after the mounting of the pipes, a heating by induction of the outer pipe and of the inner pipe, synchronizedly with the first mechanical expansion.

7. The process, according to claim 6, comprising lubrifying at least an inner surface of the inner pipe with a lubricant based on a mixture of water and graphite.

8. The process, according to claim 6, wherein during the heating, an electromagnetic induction coil is disposed externally to the outer pipe and the inner pipe and moves longitudinally relative to the outer pipe and the inner pipe synchronizedly with displacement of the mandrel.

9. The process, according to claim 6, wherein during the heating, a heating device is disposed internally to the outer pipe and the inner pipe and moves longitudinally relative to the outer pipe and the inner pipe together with a rod of the mandrel.

10. The process, according to claim 6, wherein after the first mechanical expansion, a bending of the multilayer pipe.

11. The process, according to claim 1, wherein after the first mechanical expansion, a heating by induction of the outer pipe and the inner pipe, synchronizedly with at least one additional hot mechanical expansion.

12. The process, according to claim 1, wherein the mandrel has the shape of a truncated cone, a maximum diameter of which is greater than the internal diameter of the inner pipe and a minimum diameter is smaller than the internal diameter of the inner pipe.

13. The process, according to claim 1, comprising, after the mounting of the pipes, welding ends of both pipes together and generating a vacuum between the inner and outer pipes.

14. The process, according to claim 1, comprising, during the first mechanical expansion, applying a flux of an inert gas between the inner and outer pipes.

15. The process, according to claim 1, wherein during the first mechanical expansion, the mandrel is moved longitudinally and internally in the inner pipe while the outer pipe and the inner pipe are held at a fixed position.

16. The process, according to claim 1, wherein during the first mechanical expansion, the mandrel is held at a fixed position while the outer pipe and the inner pipe are moved longitudinally in relation to the mandrel.

17. The process, according to claim 1, providing to the mounted pipes together an external diameter deformation of 0.1 to 20% and a wall thickness deformation of 0.1 to 40% upon producing the multilayer pipe.

18. The process, according to claim 2, further comprising, before the of mounting the pipes, a chemical preparation, comprising:
- acid pickling of an outer surface of the inner pipe and an inner surface of the outer pipe;
- neutralizing and washing of the outer surface of the inner pipe and the inner surface of the outer pipe, and applying a lubricant on the outer surface of the inner pipe and the inner surface of the outer pipe.

* * * * *